(12) United States Patent
Nagarajan et al.

(10) Patent No.: US 11,442,449 B2
(45) Date of Patent: Sep. 13, 2022

(54) OPTIMIZING PERFORMANCE OF AUTONOMOUS VEHICLES

(71) Applicant: ANI TECHNOLOGIES PRIVATE LIMITED, Bengaluru (IN)

(72) Inventors: Sathya Narayanan Nagarajan, Bengaluru (IN); Gaurav Agarwal, Fremont, CA (US)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 214 days.

(21) Appl. No.: 16/536,723

(22) Filed: Aug. 9, 2019

(65) Prior Publication Data
US 2020/0356091 A1 Nov. 12, 2020

(30) Foreign Application Priority Data
May 9, 2019 (IN) .............................. 201941018672

(51) Int. Cl.
| | | |
|---|---|---|
| G05D 1/00 | (2006.01) |
| G05D 1/02 | (2020.01) |
| G06T 7/73 | (2017.01) |
| G01S 17/931 | (2020.01) |
| B60H 1/00 | (2006.01) |

(52) U.S. Cl.
CPC ....... *G05D 1/0088* (2013.01); *B60H 1/00764* (2013.01); *B60H 1/00771* (2013.01); *G01S 17/931* (2020.01); *G05D 1/0223* (2013.01); *G05D 1/0251* (2013.01); *G05D 1/0257* (2013.01); *G06T 7/73* (2017.01); *G06T 2207/30252* (2013.01)

(58) Field of Classification Search
CPC .. G05D 1/0088; G05D 1/0257; G05D 1/0223; G05D 1/025; G01S 17/931; G01S 15/931; G01S 13/931; G06T 7/73; G06T 2207/30252
See application file for complete search history.

(56) References Cited

U.S. PATENT DOCUMENTS

| | | |
|---|---|---|
| 8,676,466 B2 | 3/2014 | Mudalige |
| 9,025,140 B2 | 5/2015 | Zhu et al. |
| 9,666,069 B2 | 5/2017 | Engelman et al. |
| 10,106,153 B1 * | 10/2018 | Xiao .................. G06K 9/00812 |
| 2016/0210775 A1 | 7/2016 | Alaniz et al. |
| 2016/0231746 A1 | 8/2016 | Hazelton et al. |
| 2018/0203443 A1 * | 7/2018 | Newman .................. B60L 1/00 |
| 2019/0080602 A1 * | 3/2019 | Rice ..................... G05D 1/0088 |
| 2019/0277962 A1 * | 9/2019 | Ingram ................. G01S 7/4013 |
| 2020/0307578 A1 * | 10/2020 | Magolan ............... B60W 20/00 |

* cited by examiner

*Primary Examiner* — Aaron L Troost
(74) *Attorney, Agent, or Firm* — Chip Law Group

(57) ABSTRACT

Optimizing performance of an autonomous vehicle (AV) includes acquiring information pertaining to a plurality of factors associated with the AV. The plurality of factors includes a route to be traversed by the AV for a ride, a type of a road included in the route, a real-time location of the AV, a time of travel, and a weather condition at the time of travel. An optimal configuration is selected based on the acquired information for operating components of the AV. The components are configured in real time to operate at the optimal configuration. When the components operate at the optimal configuration, a power consumed by the components is reduced and a durability of the components is increased relative to when the components operate at a first configuration that is different from the optimal configuration.

20 Claims, 9 Drawing Sheets

OPTIMIZING PERFORMANCE OF AUTONOMOUS VEHICLES

CROSS-RELATED APPLICATIONS

This application claims priority of Indian Application Serial No. 201941018672, filed May 9, 2019, the contents of which are incorporated herein by reference.

FIELD

Various embodiments of the disclosure relate generally to autonomous vehicles (AVs). More specifically, various embodiments of the disclosure relate to optimizing performance of the AVs.

BACKGROUND

The introduction of autonomous vehicles (AVs) has changed the face of transportation industry. As an AV is typically operated without a driver, a likelihood of accident due to driver errors, inattention, inexperience, misuse, or distraction is reduced. The AV usually relies on integrated components (for example, sensors, processors, or the like) and software framework executed by the inbuilt components to gauge the surroundings and operate safely. Typically, each component of the AV is configured to operate at a corresponding highest configuration for maintaining safety key performance indicators (KPIs) and mitigating worst-case travel scenarios, for example, vehicle collision, vehicle skidding, or the like.

However, the worst-case travel scenarios may not be applicable at all time instances. Thus, the components of the AV keep operating at the highest possible configuration even when not required. For example, when an AV is traversing a moderately congested road on a sunny day, keeping an infrared (IR) sensor of the AV operational is unnecessary. As the components of the AV are operated at the highest possible configuration even when not required, unnecessary power is consumed by the components and durability of the components is reduced. The unnecessary power consumption and reduced durability may adversely affect the performance of the AV.

In light of the foregoing, there exists a need for a technical and reliable solution that solves the above-mentioned problems and optimizes the performance of AVs.

Further areas of applicability of the disclosure will become apparent from the detailed description provided hereinafter. It should be understood that the detailed description of exemplary embodiments is intended for illustration purposes only and is, therefore, not intended to necessarily limit the scope of the disclosure.

SUMMARY

Optimizing performance of an autonomous vehicle (AV) is provided substantially as shown in, and described in connection with, at least one of the figures, as set forth more completely in the claims.

These and other features and advantages of the disclosure may be appreciated from a review of the following detailed description of the disclosure, along with the accompanying figures in which like reference numerals refer to like parts throughout.

DETAILED DESCRIPTION

Figure 1:
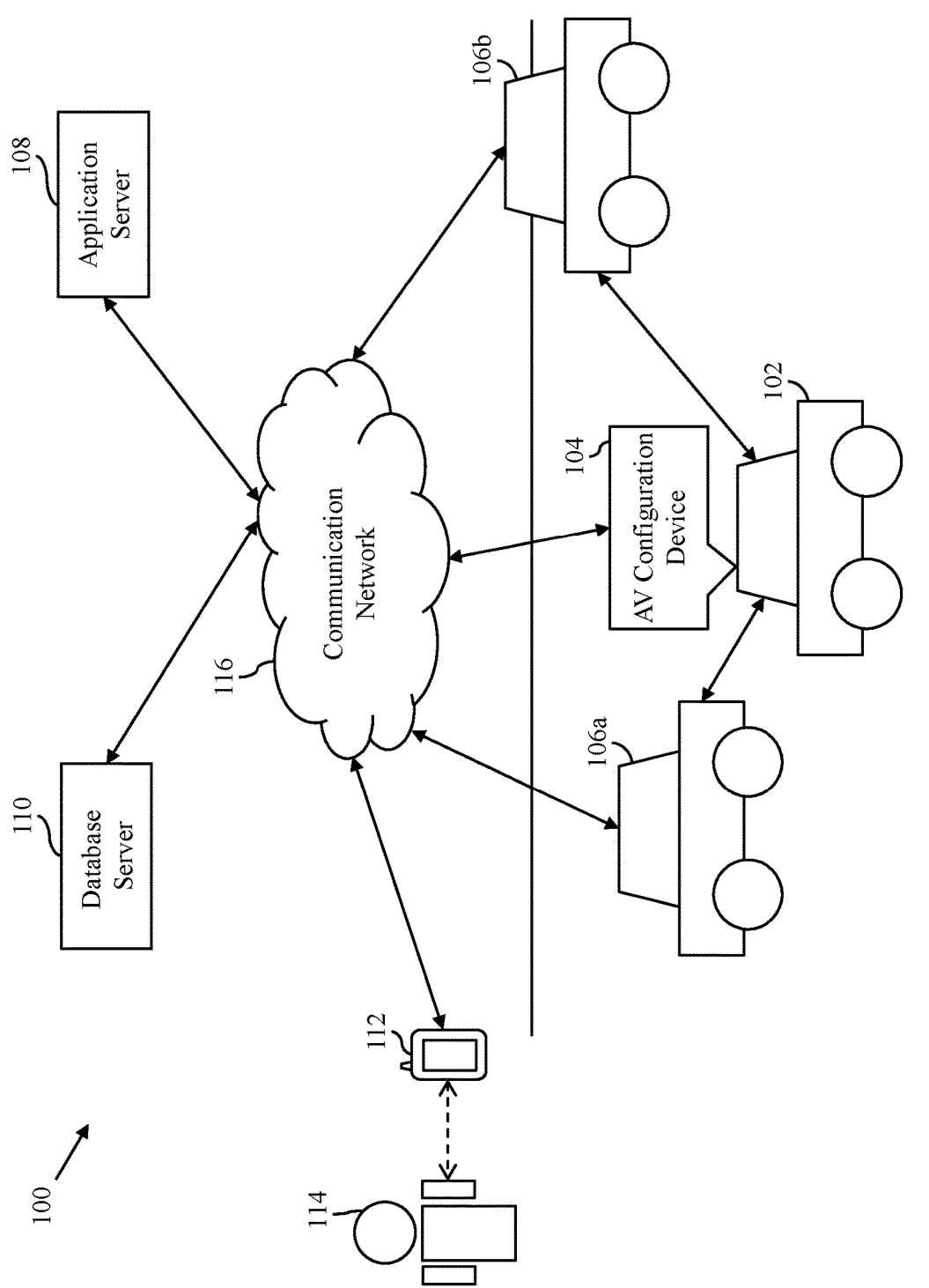
FIG. 1 is a block diagram that illustrates an environment for optimizing performance of an autonomous vehicle (AV), in accordance with an embodiment of the disclosure.

Certain embodiments of the disclosure may be found in a disclosed apparatus for optimizing performance of an autonomous vehicle (AV). Exemplary aspects of the disclosure provide a method and a system for optimizing the performance of the AV by dynamically configuring various components of the AV. The method includes one or more operations that are executed by circuitry of the system to optimize the performance of the AV. The circuitry may be an AV configuration device installed in the AV or an application server associated with the AV. The circuitry may be configured to acquire information pertaining to a plurality of factors associated with the AV. The plurality of factors may include a route to be traversed by the AV for a ride, a type of a road included in the route, a real-time location of the AV, a time of travel, and a weather condition at the time of travel. Based on the acquired information, the circuitry may be configured to select, from a set of configurations associated with the components of the AV, a first configuration to operate the components. The components may be configured to operate at the selected first configuration. A power consumed by the components operating based on the first configuration is reduced relative to a power consumed by the components operating based on a second configuration.

A durability of the components operating based on the first configuration is increased relative to a durability of the components operating based on the second configuration. The information pertaining to the plurality of factors may be acquired from at least one of a sensor of the AV, a server in communication with the AV, or a vehicle that is in communication with the AV. The components of the AV may include at least one of a processor of the AV, the sensor of the AV, or a speed controller of the AV. The sensor may correspond to an image sensor, a light detection and ranging (LiDAR) sensor, an infrared (IR) sensor, a radio detection and ranging (RADAR) sensor, or an ultrasonic sensor. The plurality of factors associated with the AV may further include a speed constraint associated with the road, a traffic condition associated with the road, a road condition of the road, a duration of the ride along the route, a three-dimensional (3D) map of the route, or a user preference provided by a user to configure the components of the AV. The weather condition at the time of travel may include an amount of daylight and/or a type of weather, at the time of travel.

Thus, the method and system of the disclosure result in optimizing the performance of the AV. At any given point of time, the components of the AV are configured to operate at the first configuration that is selected based on the plurality of factors associated with the AV at that point of time. Operating the components at the first configuration ensures that the safety key performance indicators (KPIs) of the AV are met meanwhile the power consumed by the components AV is reduced and the durability of the components is increased.

FIG. 1 is a block diagram that illustrates an exemplary environment 100 for optimizing performance of an AV 102, in accordance with an exemplary embodiment of the disclosure. The environment 100 includes the AV 102, an AV configuration device 104 in the AV 102, first and second vehicles 106a and 106b, an application server 108, and a database server 110. The environment 100 further includes a user device 112 of a user 114. The AV configuration device 104, the first and second vehicles 106a and 106b, the application server 108, the database server 110, and the user device 112 may communicate with each other by way of a communication network 116.

Figure 2:
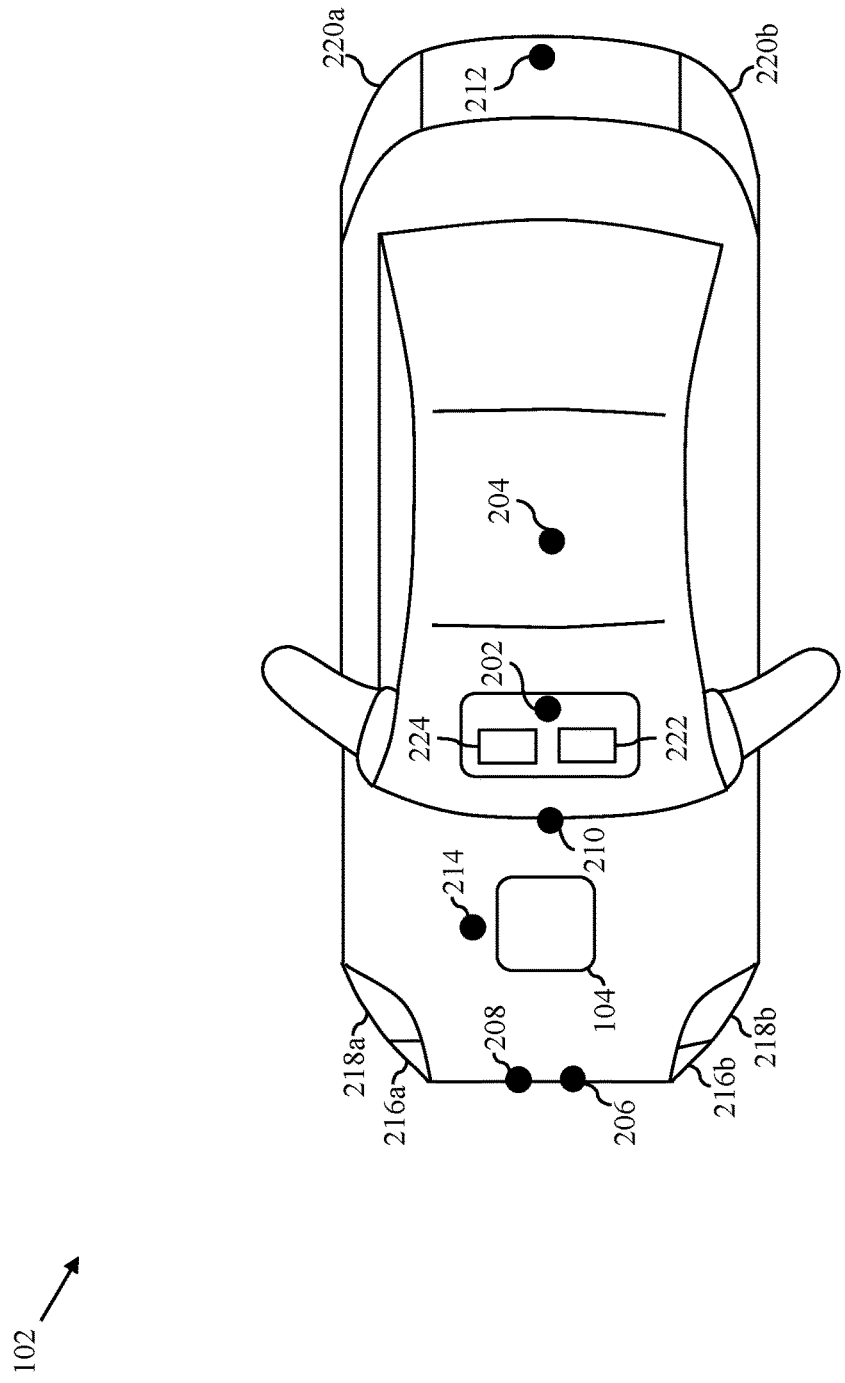
FIG. 2 is a block diagram that illustrates the AV in the environment of FIG. 1, in accordance with an embodiment of the disclosure.

The AV 102 may include suitable logic, circuitry, interfaces and/or code, executable by the circuitry, that may be configured to control one or more operations of the AV 102. In one embodiment, the AV 102 may be a driverless vehicle deployed by a transport provider to cater to travelling requirements of various passengers (e.g., the user 114). In another embodiment, the AV 102 may be a private vehicle of the user 114. Examples of the AV 102 may include a car, a bus, two-wheelers, boats, flying taxis, or the like. The AV 102 may include various components (e.g., such as sensors, processors, and/or controllers) and software framework executed by the components for implementing various aspects of vehicle motion (such as propulsion, breaking, acceleration, steering, or the like) and auxiliary behavior (such as controlling lights, controlling temperature in the AV 102, or the like) of the AV 102. Examples of the sensors (as shown in FIG. 2) may include a LiDAR sensor, a RADAR sensor, an image acquiring module, an infrared (IR) sensor, a location sensor, an ultrasonic sensor, and/or the like. Examples of the controllers (as shown in FIG. 2) may include a speed controller, a temperature controller, and/or the like. The performance of the AV 102 may be based on a configuration of the components of the AV 102.

The AV configuration device 104 may include suitable logic, circuitry, interfaces and/or code, executable by the circuitry, that may be configured to optimize the performance of the AV 102. For optimizing the performance of the AV 102, the AV configuration device 104 may be configured to acquire information pertaining to multiple factors associated with the AV 102. The factors may include a route to be traversed by the AV 102 for a ride, a type of a road included in the route, a real-time location of the AV 102, a time of travel, and a weather condition at the time of travel. The factors may further include a speed constraint associated with the road in the route, a traffic condition associated with the road, a duration of the ride along the route, a 3D map of the route, and user preferences provided by a user (e.g., the user 114) travelling in the AV 102. The AV configuration device 104 may be configured to query the application server 108 and the database server 110 for acquiring the information pertaining to the factors associated with the AV 102. The AV configuration device 104 may be configured to process sensor data of the sensors in the AV 102 for acquiring the information pertaining to the factors. The AV configuration device 104 may be further configured to acquire the information pertaining to the factors from the first and second vehicles 106a and 106b.

The AV configuration device 104 may be configured to process and analyze the acquired information. Based on the analysis of the acquired information, the AV configuration device 104 may be configured to select a first configuration for operating the components of the AV 102. The AV configuration device 104 may utilize the acquired information to select the first configuration (hereinafter, the first configuration is referred to as "an optimal configuration") from a set of configurations associated with the components of the AV 102. The set of configurations associated with the components may refer to various functional settings of the components. In one example, the set of configurations for the IR sensor of the AV 102 may include configuring the IR sensor to be operational or in-operational. In another example, the set of configurations for the LiDAR sensor of the AV 102 may include configuring the LiDAR sensor to be operational or in-operational and detecting objects within various distance ranges, for example, 500 meters, 200 meters, or the like. The optimal configuration for a component of the AV 102, under the given factors, may correspond to that functional setting of the component at which the component consumes minimum power while meeting safety key performance indicators (KPIs) of the AV 102. Examples of the safety KPIs may include, but are not limited to, a minimum accepted gap at intersections or in lane changes, maximum jerk intensity, maximum longitudinal acceleration and deceleration, or detecting objects of specific sizes and at specific distances. For example, when the AV 102 is travelling on a highway at a speed of 50 kilometers per hour (kmph) on a sunny day, for maintaining the safety KPIs of the AV 102, the LiDAR sensor of the AV 102 may not be required to detect objects that are at a distance greater than 500 meters from the AV 102. Detecting the objects that are within 500 meters from the AV 102 corresponds to the optimal configuration at that given point of time. If the LiDAR sensor is operated at any other configuration under the given factors (i.e., the highway, the speed of 80 kmph, and the sunny day), either the safety KPIs are compromised or the power consumed by the LiDAR sensor is increased relative to the optimal configuration. In another example, the AV 102 may be travelling on an urban route at a speed of 50 kmph on a sunny day. In this scenario, the LiDAR sensor may not be required to detect objects that are at a distance greater than 200 meters from the AV 102. Thus, the optimal configuration for the LiDAR sensor under the given factors (i.e., the urban route, the speed of 50 kmph, and the sunny day) is to detect objects that are within 200 meters from the AV 102. Thus, the optimal configuration for a component of the AV 102 is a function of the factors associated with the AV 102. The AV configuration device 104 may configure the components of the AV 102 to operate at the selected optimal configuration. As the AV configuration device 104 ensures that the components of the AV 102 are not always operated at the corresponding highest configuration, a durability of the components is increased.

The first and second vehicles 106a and 106b may include suitable logic, circuitry, interfaces and/or code, executable by the circuitry, that may be configured to control one or more operations of the first and second vehicles 106a and 106b, respectively. The first and second vehicles 106a and 106b may be AVs or manually driven vehicles. Examples of the first and second vehicles 106a and 106b may include a car, a bus, two-wheelers, boats, flying taxis, or the like. The first and second vehicles 106a and 106b may be traversing the same route as traversed by the AV 102. The first and second vehicles 106a and 106b may be configured to communicate information pertaining to multiple factors, such as the traffic condition associated with the road, the road condition of the road, and/or the like to the AV 102 by way of the communication network 116. In one example, the first and second vehicles 106a and 106b are also deployed by the transport provider of the AV 102.

The application server 108 may include suitable logic, circuitry, interfaces, and/or code, executable by the circuitry, that may be configured to perform one or more operations for facilitating ride booking. The application server 108 may be a computing device, which may include a software framework, that may be configured to create a transportation server implementation and perform the various operations associated with the ride booking. The application server 108 may be configured to host a service application (for example, a mobile application or a web application) that runs or is executed on user devices, for example, the user device 112. The application server 108 may host the service application to offer a ride booking service to various users, such as the user 114. In one embodiment, the application server 108 may be configured to optimize the performance of the AV 102. The application server 108 may optimize the performance of the AV 102 by selecting the optimal configuration for operating the components of the AV 102. The application server 108 may be realized through various web-based technologies, such as, but not limited to, a Java web-framework, a .NET framework, a PHP (Hypertext Preprocessor) framework, or any other web-application framework. Examples of the application server 108 may include, but are not limited to, a personal computer, a laptop, or a network of computer systems.

The database server 110 may include suitable logic, circuitry, interfaces, and/or code, executable by the circuitry, that may be configured to manage and store various forms of data. In one embodiment, the database server 110 may be configured to store and manage information pertaining to a geographical area. The information may include details of various roads present in the geographical area, types and conditions of the roads, traffic condition along the roads, weather condition in the geographical area, a 3D map of the geographical area, or the like. The database server 110 may receive a query from the AV configuration device 104 or the application server 108 for providing requisite information stored in a memory of the database server 110. Based on the received query, the database server 110 may be configured to communicate the requested information to the AV configuration device 104 or the application server 108 over the communication network 116. The database server 110 may be implemented as a cloud-based server. Examples of the database server 110 may include, but are not limited to, Hadoop®, MongoDB®, MySQL®, NoSQL®, or Oracle®.

The user device 112 may include suitable logic, circuitry, interfaces and/or code, executable by the circuitry, that may be configured to perform one or more activities, such as ride booking activities. The user device 112 may be configured to serve as a communication device of the user 114. Examples of the user device 112 may include, but are not limited to, a personal computer, a laptop, a smartphone, a tablet, or any other device capable of communicating via the communication network 116. The user device 112 may be used by the user 114 to communicate with the AV 102, the application server 108, and the database server 110 over the communication network 116. The user device 112 may be further used by the user 114 to book a ride. The ride may be booked by the user 114 by way of the service application that runs or is executed on the user device 112. The user device 112 may be further used by the user 114 to input preferences for configuring the components of a vehicle (e.g., the AV 102) that is allocated to the ride. The preferences may be inputted by the user 114 by using the service application that runs or is executed on the user device 112. Various modes of inputs used by the user 114 to input the preferences may include, but are not limited to, a touch-based input, a text-based input, a gesture-based input, an audio-based input, or a combination thereof.

The communication network 116 may include suitable logic, circuitry, interfaces, and/or code, executable by the circuitry, that may be configured to transmit messages and requests between various entities, such as the AV configuration device 104, the first and second vehicles 106a and 106b, the application server 108, the database server 110 and/or the user device 112. Examples of the communication network 116 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an IR network, a radio frequency (RF) network, and combinations thereof. Various entities in the environment 100 may connect to the communication network 116 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the AV configuration device 104 may be configured to acquire the information pertaining to the factors (such as the route to be traversed by the AV 102 for the ride, the type of the road included in the route, the real-time location of the AV 102, the time of travel, the weather condition at the time of travel, or the like) associated with the AV 102. The AV configuration device 104 may acquire the information from the first and second vehicles 106a and 106b, the application server 108, the database server 110, and/or the sensors of the AV 102. Based on the acquired information, the AV configuration device 104 may be configured to select the optimal configuration for operating the components. For example, the AV configuration device 104 may turn off one or more components of the AV 102 that are not required to maintain the safety KPIs of the AV 102 under the given factors. The AV configuration device 104 may further turn off those components of the AV 102 that do not provide useful information or provide redundant information under the given factors. In other words, the AV configuration device 104 may operate only those components which are sufficient to safely run the AV 102 under the given factors. The AV configuration device 104 may configure the components of the AV 102 to operate at the selected optimal configuration. When the components of the AV 102 operate at the optimal configuration, the power consumed by the components is minimum while meeting the safety KPIs. As a result, the durability of the components is also increased.

In another embodiment, the application server 108 may be configured to acquire the information pertaining to the factors associated with the AV 102 and select the optimal configuration for operating the components of the AV 102. In such a scenario, the application server 108 may be configured to instruct the AV configuration device 104 to configure the components of the AV 102 based on the selected optimal configuration.

FIG. 2 is a block diagram that illustrates the AV 102, in accordance with an embodiment of the disclosure. The AV 102 includes the AV configuration device 104 to configure various components of the AV 102. Examples of the components may include, but are not limited to, a location sensor 202, a LiDAR sensor 204, a RADAR sensor 206, an IR sensor 208, an image acquiring module 210, an ultrasonic sensor 212, a speed controller 214, or other components that are required for the functioning of the AV 102.

The location sensor 202 may include suitable logic, circuitry, interfaces, and/or code, executable by the circuitry, that may be configured to determine a current location of the AV 102. In one example, the location sensor 202 may be a satellite-based radio-navigation system. The location sensor 202 may receive the current location information of the AV 102 from satellites of a global navigation satellite system (GLONASS), global positioning system (GPS), or the like. In one example, as shown in FIG. 2, the location sensor 202 may be positioned inside the AV 102. It will be apparent to a person of skill in the art that the location sensor 202 may be positioned at a different place in the AV 102 and that the AV 102 may include more than one location sensor without deviating from the scope of the disclosure.

The LiDAR sensor 204 may include suitable logic, circuitry, interfaces, and/or code, executable by the circuitry, that may be configured to measure distances between the AV 102 and various objects in the vicinity of the AV 102. The LiDAR sensor 204 may be configured to use laser light pulses to measure the distances. The LiDAR sensor 204 may be configured to illuminate objects with pulsed laser light and measure return time and wavelengths of pulses reflected by the objects. In one example, as shown in FIG. 2, the LiDAR sensor 204 may be positioned on top of the AV 102 facing a direction of travel of the AV 102. In such a scenario, the LiDAR sensor 204 may detect the objects in the path of travel of the AV 102. It will be apparent to a person of skill in the art that the LiDAR sensor 204 may be positioned at a different place in the AV 102 and that the AV 102 may include more than one LiDAR sensor without deviating from the scope of the disclosure.

The RADAR sensor 206 may include suitable logic, circuitry, interfaces, and/or code, executable by the circuitry, that may be configured to determine distance, angle, and velocity of objects from the AV 102 by using radio waves. For determining the distance, angle, and velocity of the objects, the RADAR sensor 206 may be configured to emit radio waves in the direction of the objects. The objects may reflect the radio waves emitted by the RADAR sensor 206. The RADAR sensor 206 may be configured to determine the distance, angle, and velocity of the objects relative to the AV 102 based on the reflected radio waves. In one example, as shown in FIG. 2, the RADAR sensor 206 may be positioned in front of the AV 102 facing the direction of travel of the AV 102. In such a scenario, the RADAR sensor 206 detects the objects in the path of travel of the AV 102. It will be apparent to a person of skill in the art that the RADAR sensor 206 may be positioned at a different place in the AV 102 and that the AV 102 may include more than one RADAR sensor without deviating from the scope of the disclosure.

The IR sensor 208 may include suitable logic, circuitry, interfaces, and/or code, executable by the circuitry, that may be configured to detect objects during low visibility. For detecting the objects during low visibility, the IR sensor 208 may be configured to measure heat (i.e., IR radiations) emitted by the objects. In one example, as shown in FIG. 2, the IR sensor 208 may be positioned in front of the AV 102 facing a direction of travel of the AV 102. In such a scenario, the IR sensor 208 detects the objects that are located in front of the AV 102. It will be apparent to a person of skill in the art that the IR sensor 208 may be positioned at a different place in the AV 102 and that the AV 102 may include more than one IR sensor without deviating from the scope of the disclosure.

The image acquiring module 210 may include suitable logic, circuitry, interfaces, and/or code, executable by the circuitry, that may be configured to capture images of the surroundings of the AV 102. The image acquiring module 210 may include an image sensor integrated with a lens, and/or control electronics for capturing the images. The images captured by the image acquiring module 210 may be utilized to detect the presence of various objects in the vicinity of the AV 102. In one example, as shown in FIG. 2, the image acquiring module 210 may be positioned on a windscreen inside the AV 102 facing a direction of travel of the AV 102. In such a scenario, the image acquiring module 210 detects and captures the images of the objects that are located in front of the AV 102. It will be apparent to a person of skill in the art that the image acquiring module 210 may be positioned at a different place in the AV 102 and that the AV 102 may include more than one image acquiring module without deviating from the scope of the disclosure.

The ultrasonic sensor 212 may include suitable logic, circuitry, interfaces, and/or code, executable by the circuitry, that may be configured to determine a distance of an object from the AV 102. For determining the distance of the object from the AV 102, the ultrasonic sensor 212 may be configured to emit ultrasonic sound waves in the direction of the object. The object may reflect the ultrasonic sound waves emitted by the ultrasonic sensor 212. The ultrasonic sensor 212 may be configured to determine the distance of the object from the AV 102 based on the reflected ultrasonic sound waves. In one example, as shown in FIG. 2, the ultrasonic sensor 212 may be positioned at the backside of the AV 102. In such a scenario, the ultrasonic sensor 212 detects the distance of the object that is located behind the AV 102. It will be apparent to a person of skill in the art that the ultrasonic sensor 212 may be positioned at a different place in the AV 102 and that the AV 102 may include more than one ultrasonic sensor without deviating from the scope of the disclosure.

The speed controller 214 may be configured to control and limit the speed of the AV 102 based on the optimal configuration selected by the AV configuration device 104. For example, on an urban road, the speed controller 214 may limit the speed of the AV 102 to 50 kmph.

In operation, the application server 108 may receive a ride request from the user device 112. The ride request may be initiated by the user 114 to travel from a first location 'A' to a second location 'B'. The ride request may include preferences of the user 114. For example, the user 114 may have specified a route that is to be taken for the ride. In another example, the user 114 may have specified a type of road that needs to be traversed for the ride. Other examples of the preferences provided by the user 114 may include a temperature to be maintained inside an allocated vehicle, or the like.

Based on the ride request, the application server 108 may be configured to identify a first route between the first location 'A' and the second location 'B'. The application server 108 may be further configured to allocate a vehicle to the ride request. In a non-limiting example, it is assumed that the application server 108 allocates the AV 102 to the ride request and communicates allocation information to the AV 102 over the communication network 116. The allocation information may include a time of travel, a source location (e.g., the first location 'A'), a destination location (e.g., the second location 'B'), a ride duration, a route information and/or the like. The AV configuration device 104 may be configured to receive the allocation information from the application server 108. Based on the allocation information, the AV configuration device 104 may be configured to instruct the AV 102 to travel along the first route.

While the AV 102 is traversing the first route, the AV configuration device 104 may be configured to optimize the performance of the AV 102. For optimizing the performance of the AV 102, the AV configuration device 104 may be configured to acquire the information pertaining to the factors associated with the AV 102. The factors for which the AV configuration device 104 acquires the information may include the first route traversed by the AV 102, types of roads and road conditions of the roads included in the first route, the real-time location of the AV 102, the time of travel, and the weather condition at the time of travel. Examples of the types of roads may include, but are not limited to, an urban road and a highway. The weather condition at the time of travel may include an amount of day light present and a type of weather, at the time of travel. Examples of the types of weather may include, but are not limited to, a sunny weather, a cloudy weather, a foggy weather, and a rainy weather.

The information of the first route and the time of travel may be included in the allocation information. For example, the user 114 may have requested for the ride at '8:00 PM' from the first location 'A' to the second location 'B'. The allocation information, in this scenario, may include the time of travel as '8:00 PM' and navigation details of the first route. The AV configuration device 104 may be configured to query the database server 110 or a third-party server (e.g., Google Maps® or the like) to acquire the information of the types and conditions of the roads included in the first route and the weather condition at the time of travel. For example, the AV configuration device 104 may communicate the details of the first route and the time of travel to the database server 110. Based on the details of the first route, the database server 110 may identify the roads included in the first route and may communicate the information pertaining to the types and conditions of the roads included in the first route to the AV configuration device 104. The database server 110 may further communicate the information pertaining to the weather condition at the time of travel to the AV configuration device 104. The AV configuration device 104 may be further configured to acquire the real-time location of the AV 102 by using the location sensor 202.

The factors for which the AV configuration device 104 acquires the information may further include a speed constraint associated with each road in the first route, a traffic condition associated with each road in the first route, a duration of the ride along the first route, a 3D map of the first route, and the user preferences provided by the user 114. The information of the duration of the ride and the user preferences may be included in the allocation information received by the AV configuration device 104. The AV configuration device 104 may be configured to query the database server 110 or the third-party server to acquire the information pertaining to the speed constraint, the traffic condition, and the 3D map, associated with each road in the first route. For example, based on the query received from the AV configuration device 104, the database server 110 may notify the AV configuration device 104 that the first route includes an urban road, having a speed constraint of 50 kmph and mild traffic, and a highway, having a speed constraint of 80 kmph and heavy traffic. The database server 110 may further communicate the 3D map of the first route to the AV configuration device 104. In one embodiment, the AV configuration device 104 may be configured to utilize one or more of the LiDAR sensor 204, the RADAR sensor 206, the IR sensor 208, the image acquiring module 210, or the ultrasonic sensor 212 to acquire the information pertaining to the traffic condition on the roads of the first route. In one embodiment, the first and second vehicles 106a and 106b may be in the vicinity (i.e., within a communication-range of the AV configuration device 104) of the AV 102 and may be travelling along the same route as of the AV 102. In such a scenario, the AV configuration device 104 may be configured to communicate with the first and second vehicles 106a and 106b to acquire the information pertaining to the types of roads and road conditions of the roads included in the first route, the weather condition at the time of travel, the speed constraint associated with each road in the first route, and the traffic condition associated with each road in the first route.

Based on the acquired information, the AV configuration device 104 may be configured to select an optimal configuration to operate the components (e.g., the location sensor 202, the LiDAR sensor 204, the RADAR sensor 206, the IR sensor 208, the image acquiring module 210, the ultrasonic sensor 212, and the speed controller 214) of the AV 102. In other words, the AV configuration device 104 may be configured to select those components that are essentially required to run the AV 102 and maintain the safety KPIs of the AV 102 under the given factors. The AV configuration device 104 may select the optimal configuration from the set of configurations associated with the components of the AV 102. After the selection of the optimal configuration, the AV configuration device 104 may configure, in real time, the components to operate at the selected the optimal configuration.

For example, when the AV 102 is travelling on the highway of the first route at the speed of 80 kmph on a sunny day, for maintaining the safety KPIs of the AV 102, the LiDAR sensor 204 may not be required to detect objects that are at a distance greater than 500 meters from the AV 102. Detecting the objects that are within 500 meters from the AV 102 corresponds to the optimal configuration for the LiDAR sensor 204 at that given point of time. If the LiDAR sensor 204 is operated at any other configuration under the given factors (i.e., the highway, the speed of 80 kmph, and the sunny day), either the safety KPIs are compromised or the power consumed by the LiDAR sensor 204 is increased relative to the optimal configuration. Thus, the AV configuration device 104 configures the LiDAR sensor 204 to be operational and detect the objects that are within 500 meters from the AV 102. Since the weather type is sunny, the visibility is high. In such a scenario, the AV configuration device 104 may select to switch-off the IR sensor 208 as the information provided by the IR sensor 208 is more useful when the visibility is low and switch-on the image acquiring module 210 to detect the presence of objects in the vicinity of the AV 102. The image acquiring module 210 may successfully capture images and detect objects due to high visibility. The AV configuration device 104 may be further configured to switch-off fog lights 216a and 216b (hereinafter, the fog lights 216a and 216b are collectively referred to and designated as "fog lights 216") of the AV 102. Switching-off the IR sensor 208 and the fog lights 216, and turning on the image acquiring module 210, in this scenario, corresponds to the optimal configuration. Likewise, the AV configuration device 104 may select the optimal configuration for each component of the AV 102.

In another example, when the AV 102 is travelling on the urban road having a speed constraint of 50 kmph, for maintaining the safety KPIs of the AV 102, the LiDAR sensor 204 may be sufficient and it may not be required for the RADAR sensor 206 to be operational. In such a scenario, the optimal configuration for the LiDAR sensor 204 is to be operational and the optimal configuration for the RADAR sensor 206 is to be in-operational. Thus, the AV configuration device 104 configures the RADAR sensor 206 to be in-operational and configures the LiDAR sensor 204 to be operational and to detect the objects that are within 500 meters from the AV 102. As the speed constraint of the urban road is 50 kmph, the AV configuration device 104 may be further configured to limit the speed of the AV 102 to 50 kmph. In this scenario, the optimal configuration for the speed controller 214 is to limit the speed of the AV 102 to 50 kmph.

In another example, when the AV 102 is travelling on the highway of the first route, for maintaining the safety KPIs of the AV 102, both the LiDAR sensor 204 and the RADAR sensor 206 may be required. In such a scenario, the optimal configuration for the LiDAR sensor 204 and the RADAR sensor 206 is to be operational. Thus, the AV configuration device 104 configures the LiDAR sensor 204 and the RADAR sensor 206 to be operational.

In another example, the AV 102 may be travelling on the urban road of the first route on a foggy day. In this scenario, the image acquiring module 210 may not be able to capture clear images and detect objects due to poor visibility. Thus, under the given factors (i.e., the urban road and the foggy day), the optimal configuration selected by the AV configuration device 104 would be to switch-off the image acquiring module 210 and switch-on the IR sensor 208 and the fog lights 216. Further, during the foggy weather, the information provided by the LiDAR sensor 204 may not be useful, thus the optimal configuration selected by the AV configuration device 104 further includes switching-off the LiDAR sensor 204. Based on the selected optimal configuration, the AV configuration device 104 may switch-on the IR sensor 208 and the fog lights 216, and switch-off the image acquiring module 210 and the LiDAR sensor 204.

In another example, when the AV 102 may be travelling on the highway on a rainy day. In such a scenario, the fog lights 216 may be required to improve the visibility. Thus, the optimal configuration selected by the AV configuration device 104 for the fog lights 216 is to be operational.

When the components of the AV 102 (for example, the location sensor 202, the LiDAR sensor 204, the RADAR sensor 206, the IR sensor 208, the image acquiring module 210, the ultrasonic sensor 212, or the speed controller 214) are operating at the optimal configuration, the power consumed by the components is minimized while maintaining the safety KPIs. As the components of the AV 102 are not operated at the highest possible configuration at all times, the durability (i.e., a lifespan) of the components is increased. It will be apparent to a person of ordinary skill in the art that the abovementioned examples are for illustrative purposes and should not be construed to limit the scope of the disclosure.

In another embodiment, the AV 102 may be the private vehicle of the user 114. In such a scenario, the user 114 may input source and destination locations to the AV 102 either directly or by way of the user device 112. Based on the source and destination locations inputted by the user 114, the AV configuration device 104 may determine the first route that is to be taken by the AV 102 and optimize the performance of the AV 102 as described in the foregoing.

In another embodiment, the AV configuration device 104 may configure one or more other components of the AV 102 as well to operate at the optimal configuration without deviating from the scope of the disclosure. Examples of the other components may include head lights 218a and 218b (hereinafter, the head lights 218a and 218b are collectively referred to and designated as "head lights 218"), tail lights 220a and 220b (hereinafter, the tail lights 220a and 220b are collectively referred to and designated as "tail lights 220"), an entertainment system 222, an air conditioner system 224, or components that are not essential for maintaining the safety KPIs of the AV 102.

In another embodiment, instead of the AV configuration device 104, the application server 108 may be configured to acquire the information pertaining to the factors associated with the AV 102 and select the optimal configuration for operating the components of the AV 102. The application server 108 may be further configured to instruct the AV configuration device 104 to configure the components of the AV 102 to operate at the optimal configuration. Functions performed by the application server 108 are described in detail in conjunction with FIG. 4.

Figure 3:
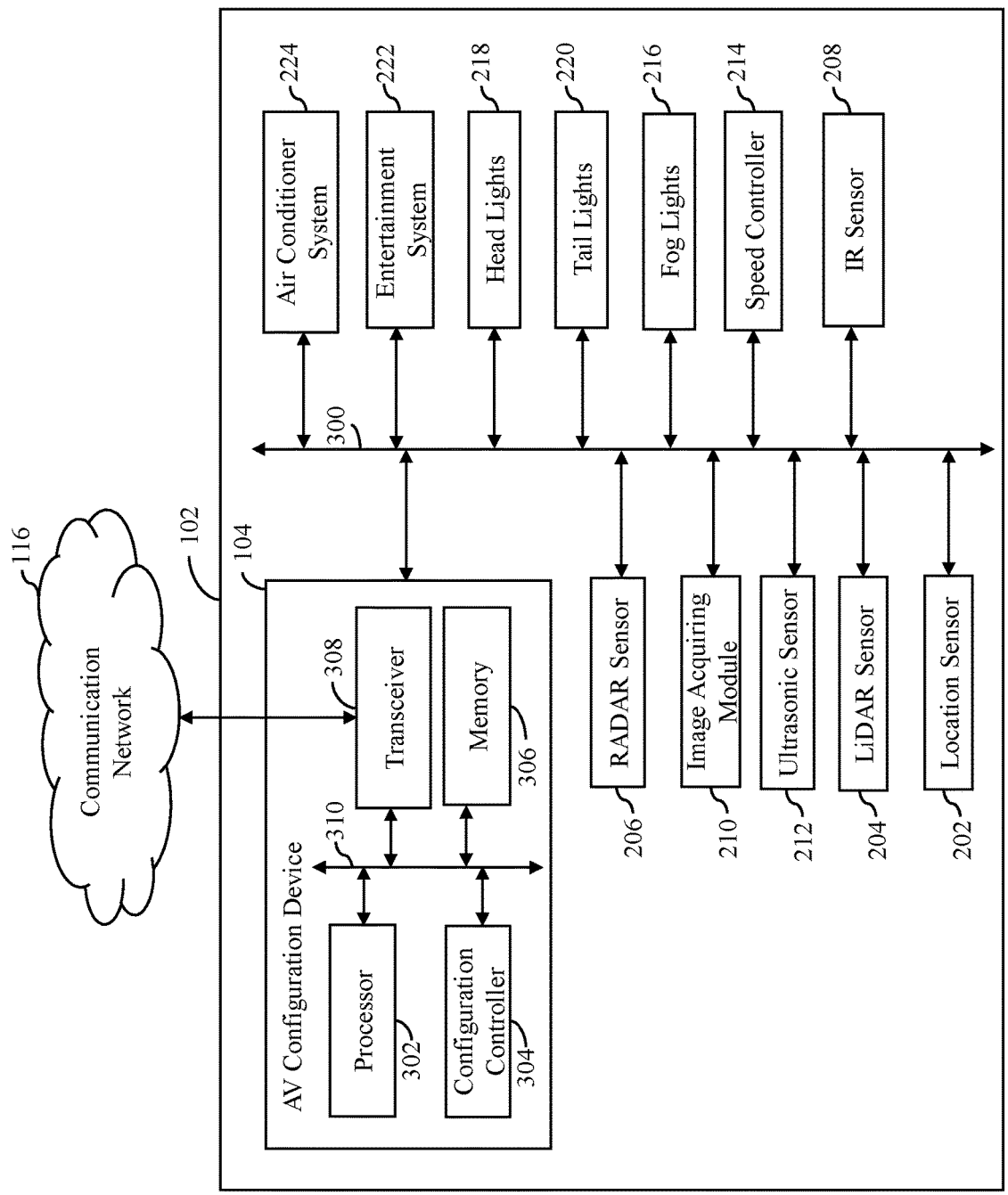
FIG. 3 is a block diagram that illustrates the AV in the environment of FIG. 1, in accordance with an embodiment of the disclosure.

FIG. 3 is a block diagram that illustrates the AV 102, in accordance with an embodiment of the disclosure. The AV configuration device 104 may communicate with the components (e.g., the location sensor 202, the LiDAR sensor 204, the RADAR sensor 206, the IR sensor 208, the image acquiring module 210, the ultrasonic sensor 212, the speed controller 214, the fog lights 216, the head lights 218, the tail lights 220, the entertainment system 222, and the air conditioner system 224) of the AV 102 by way of a first communication bus 300. The AV configuration device 104 may include a processor 302, a configuration controller 304, a memory 306, and a transceiver 308. The processor 302, the configuration controller 304, the memory 306, and the transceiver 308 may communicate with each other by way of a second communication bus 310.

The processor 302 may include suitable logic, circuitry, interfaces, and/or code, executable by the circuitry, that may be configured to perform one or more operations for optimizing the performance of the AV 102. The processor 302 may be configured to acquire and process the information pertaining to the factors associated with the AV 102. As described in FIG. 2, the processor 302 may be further configured to select the optimal configuration for operating the components (for example, the location sensor 202, the LiDAR sensor 204, the RADAR sensor 206, the IR sensor 208, the image acquiring module 210, the ultrasonic sensor 212, the speed controller 214, the lights 216, or the like) of the AV 102 based on the acquired information.

The configuration controller 304 may include suitable logic, circuitry, interfaces, and/or code, executable by the circuitry, that may be configured to operate the components of the AV 102 at the optimal configuration selected by the processor 302. The configuration controller 304 may configure the components to operate at the optimal configuration in real time. For example, when the processor 302 determines that the LiDAR sensor 204 is not required to be operational, the configuration controller 304 switches-off the LiDAR sensor 204 by way of the second communication bus 310. Likewise, the configuration controller 304 may configure the other components of the AV 102 based on the optimal configuration selected by the processor 302. When the components of the AV 102 operate at the optimal configuration, the power consumed by the components under the given factors may be minimum while meeting the safety KPIs. As a result, the durability (i.e., the lifespan) of the components may also be increased. A processing power required by the processor 302 may also be reduced when one or more of the components are switched-off or operated at a lower configuration.

The memory 306 may include suitable logic, circuitry, interfaces, and/or code, executable by the circuitry, that may be configured to store one or more instructions executable by the processor 302, the configuration controller 304, and the transceiver 308. The memory 306 may be configured to store and manage the information pertaining to the factors associated with the AV 102. The memory 306 may be further configured to store and manage data received from various vehicles (for example, the first and second vehicles 106a and 106b), the third-party server, the application server 108, and the database server 110.

The transceiver 308 may include suitable logic, circuitry, interfaces, and/or code, executable by the circuitry, that may be configured to transmit (or receive) data to (or from) various servers or devices, such as the application server 108, the database server 110, or the user device 112 by way of the communication network 116. The AV configuration device 104 may be configured to communicate with the first and second vehicles 106a and 106b, the application server 108, the database server 110, or the third-party server by way of the transceiver 308. Examples of the transceiver 308 may include, but are not limited to, an antenna, a radio frequency transceiver, a wireless transceiver, and a Bluetooth transceiver. The transceiver 308 may be configured to communicate with the AV configuration device 104, the first and second vehicles 106a and 106b, the application server 108, the database server 110, or the user device 112 using various wired and wireless communication protocols, such as TCP/IP, UDP, or any combination thereof.

Figure 4:
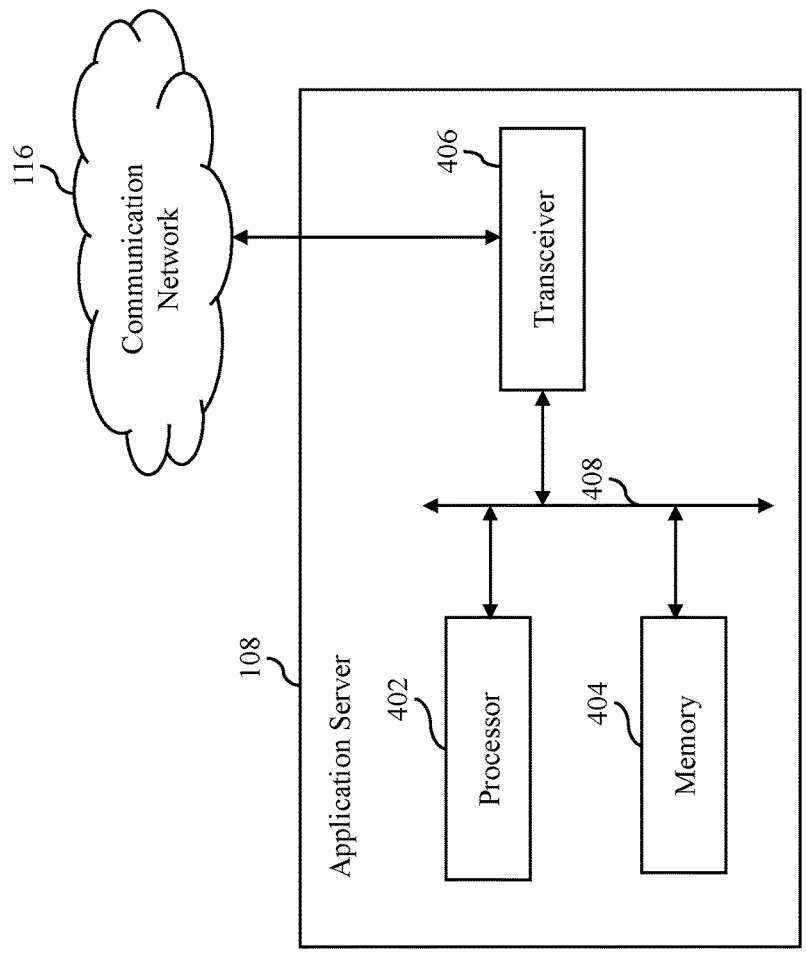
FIG. 4 is a block diagram that illustrates an application server in the environment of FIG. 1, in accordance with an embodiment of the disclosure.

FIG. 4 is a block diagram that illustrates the application server 108, in accordance with an embodiment of the disclosure. The application server 108 may include a processor 402, a memory 404, and a transceiver 406. The processor 402, the memory 404, and the transceiver 406 may communicate with each other by way of a third communication bus 408.

The processor 402 may include suitable logic, circuitry, interfaces, and/or code, executable by the circuitry, that may be configured to perform one or more operations for optimizing the performance of the AV 102. The processor 402 may be configured to acquire and process the information pertaining to the factors associated with the AV 102. The processor 402 may be further configured to select the optimal configuration for operating the components (for example, the location sensor 202, the LiDAR sensor 204, the RADAR sensor 206, the IR sensor 208, the image acquiring module 210, the ultrasonic sensor 212, the speed controller 214, the fog lights 216) of the AV 102 based on the acquired information. The processor 402 may select the optimal configuration in a similar manner as selected by the AV configuration device 104.

The memory 404 may include suitable logic, circuitry, interfaces, and/or code, executable by the circuitry, that may be configured to store one or more instructions executable by the processor 402 and the transceiver 406. The memory 404 may be configured to store and manage the information pertaining to the factors associated with the AV 102. The memory 404 may be further configured to store and manage data received from various vehicles (for example, the first and second vehicles 106a and 106b), the third-party server, the application server 108, and the database server 110.

The transceiver 406 may include suitable logic, circuitry, interfaces, and/or code, executable by the circuitry, that may be configured to transmit (or receive) data to (or from) various servers or devices, such as the AV configuration device 104, the database server 110, or the user device 112 by way of the communication network 116. The application server 108 may be configured to communicate with the AV configuration device 104, the first and second vehicles 106a and 106b, the database server 110, and the third-party server by way of the transceiver 406. Examples of the transceiver 406 include, but are not limited to, an antenna, a radio frequency transceiver, a wireless transceiver, and a Bluetooth transceiver. The transceiver 406 may communicate with the AV configuration device 104, the database server 110, or the user device 112 using various wired and wireless communication protocols, such as TCP/IP, UDP, or any combination thereof.

In one embodiment, instead of the AV configuration device 104, the application server 108 may acquire the information pertaining to the factors associated with the AV 102. In operation, the processor 402 may be configured to acquire the information pertaining to the factors associated with the AV 102 by way of the transceiver 406. The processor 402 may acquire the information from the AV 102, the first and second vehicles 106a and 106b, the database server 110, and the third-party server. The acquired information may be then stored in the memory 404 for further processing. Based on the acquired information, the processor 402 may be configured to select the optimal configuration for operating the components. For example, the processor 402 may select to keep only those components operational which are sufficient to run the AV 102 under the given factors and may select to switch-off the components that are not required to be operational for meeting the safety KPIs. The transceiver 406 may be configured to transmit the optimal configuration of the components to the AV configuration device 104. When the AV configuration device 104 receives the optimal configuration, the AV configuration device 104 may configure the components to operate at the optimal configuration. When the components of the AV 102 operate at the optimal configuration, the power consumed by the components may be minimum while meeting the safety KPIs. As a result, the durability of the components may be increased.

Figure 5A:
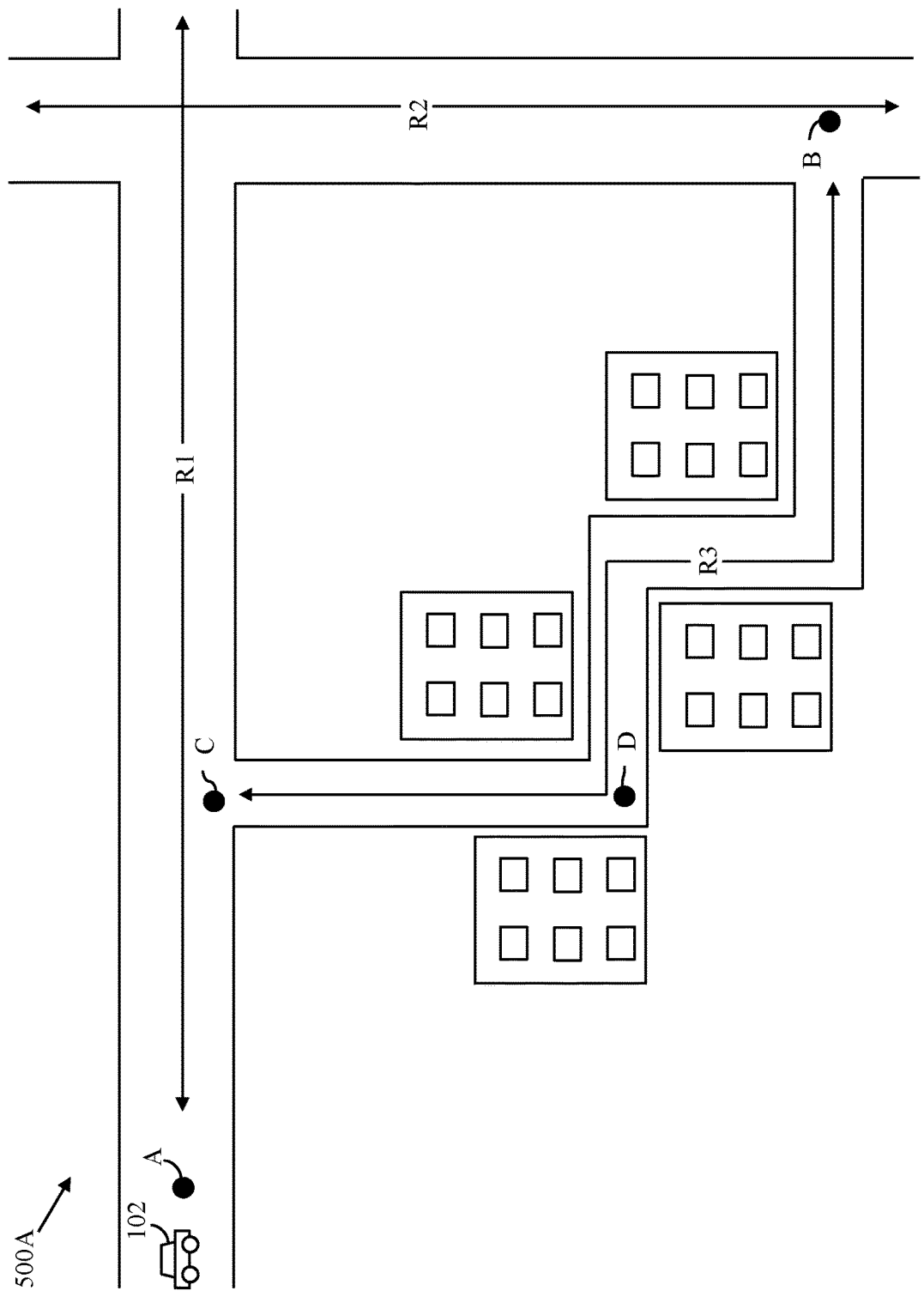
FIGS. 5A and 5B are block diagrams that illustrate exemplary scenarios for optimizing the performance of the AV in the environment of FIG. 1, in accordance with an embodiment of the disclosure.
Figure 5B:
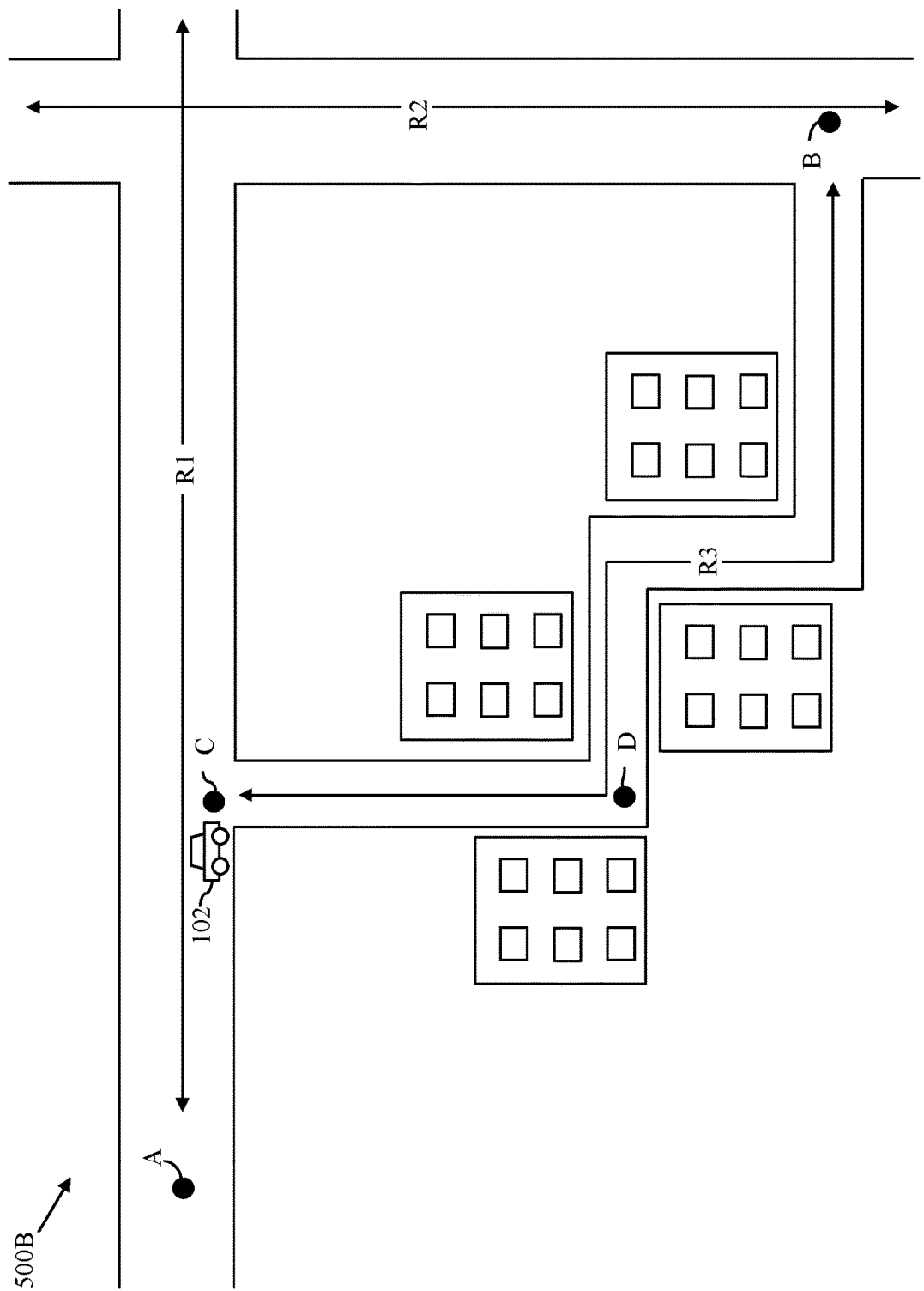

FIGS. 5A and 5B are block diagrams that illustrate exemplary scenarios 500A and 500B, respectively, for optimizing the performance of the AV 102, in accordance with an embodiment of the disclosure. The exemplary scenario 500A involves the AV 102 and the application server 108.

A ride request may be initiated by the user 114 for travelling from a pick-up location 'A' to a drop-off location 'B' at 5:30 PM and the AV 102 may be allocated to the ride request of the user 114. As shown in the exemplary scenario 500A, the AV 102 has reached the first location 'A' to pick up the user 114. After picking up the user 114 from the first location 'A' at 5:30 PM, the AV 102 starts traversing a first road R1. When the AV 102 starts traversing the first road R1, the AV configuration device 104 may be configured to acquire the information pertaining to the factors associated with the AV 102 (as described in FIG. 2). In the exemplary scenario 500A, the information acquired by the AV configuration device 104 may include navigation details of a first route between the pick-up and drop-off locations 'A' and the time of travel '5:30 PM', an estimated duration of travel, types of the first road R1 and a second road R2 of the first route, speed constraints of the first and second roads R1 and R2, real-time weather condition, real-time traffic condition on the first and second roads R1 and R2, the 3D map of the first route, or the like.

Based on the acquired information, the AV configuration device 104 may select the optimal configuration for the components of the AV 102. The components may include the location sensor 202, the LiDAR sensor 204, the RADAR sensor 206, the IR sensor 208, the image acquiring module 210, the ultrasonic sensor 212, the fog lights 216 or the like. The AV configuration device 104 may then configure the components of the AV 102 at the selected optimal configuration. For example, once the navigation details of the first route are obtained, the AV configuration device 104 may switch-off the location sensor 202 to reduce the power consumed by the location sensor 202. Further, as the AV 102 is travelling on the first road R1 at the time when the visibility is high, the AV configuration device 104 may configure the LiDAR sensor 204 to detect objects within 500 meters and may not turn on the IR sensor 208, the head lights 218, and the tail lights 220. Further, the AV configuration device 104 may configure the speed controller 214 to limit a speed of the AV 102 to 80 kmph (i.e., the speed constraint of the first road R1). The AV configuration device 104 may continue to acquire the information pertaining to the factors associated with the AV 102 and if any of the factors change, the AV configuration device 104 may select a new optimal configuration for operating the components of the AV 102.

With reference to FIG. 5B, the exemplary scenario 500B shows that the AV 102 has reached a location 'C' on the first road R1. The AV 102 may reach the location 'C' at '6:00 PM'. At the time instance when the AV 102 reaches the location 'C', a new input preference may be provided by the user 114 by way of the user device 112. The input preference may indicate addition of an intermediate stop, for example, location 'D', during the ride. The AV configuration device 104 may check the navigation details of the first route and determine that the location 'D' does not lie on the first route. In such a scenario, the AV configuration device 104 may switch-on the location sensor 202 to obtain a current location of the AV 102 and obtain navigation details of a second route. The second route starts from the location 'C' and ends at the drop-off location and includes the location 'D' as an intermediate stop. As the route to be traversed by the AV 102 has changed, the AV configuration device 104 may select new optimal configurations for the components of the AV 102, thereby optimizing the performance of the AV 102. In other words, for meeting the safety KPIs on the second route and minimizing the power consumed by the AV 102 under the given factors, the AV configuration device 104 may reconfigure the components of the AV 102 based on the new optimal configuration. For example, since the second route includes the urban road R3, the AV configuration device 104 may configure the speed controller 214 to limit the speed of the AV 102 to 50 kmph (i.e., the speed constraint of the urban road R3). Further, the AV configuration device 104 may configure the LiDAR sensor 204 to detect objects within 200 meters from the AV 102 and may switch-on the IR sensor 208 due to reduced visibility at 6:00 PM.

It will be apparent to those of ordinary skill in the art that the abovementioned exemplary scenarios are for illustrative purposes and should not be construed to limit the scope of the disclosure. In another embodiment, the change in the factors associated with the AV 102 may be caused due to change in the weather conditions, the traffic conditions, or the like.

Figure 6:
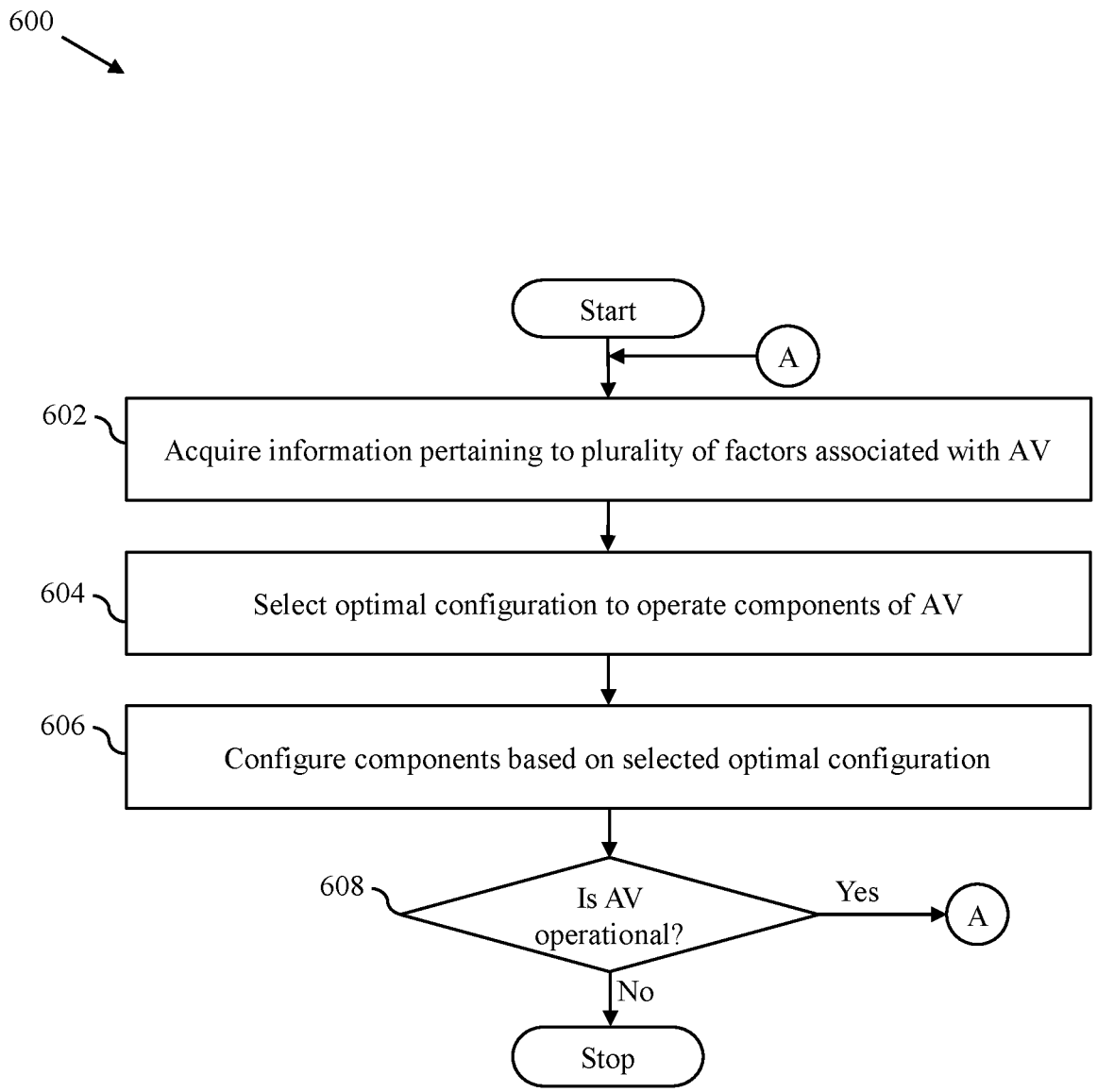
FIG. 6 is a flow chart that illustrates a method for optimizing the performance of the AV, in accordance with an embodiment of the disclosure.

FIG. 6 is a flow chart 600 that illustrates a method for optimizing the performance of the AV 102, in accordance with an embodiment of the disclosure.

At 602, the information pertaining to the plurality of factors associated with the AV 102 is acquired. The information may be acquired by the AV configuration device 104 from the first and second vehicles 106a and 106b, the application server 108, the database server 110, the location sensor 202, the LiDAR sensor 204, the RADAR sensor 206, the IR sensor 208, the image acquiring module 210, the ultrasonic sensor 212, or the like. The plurality of factors associated with the AV 102 may include a route to be traversed by the AV 102 for a ride, a type of a road included in the route, a real-time location of the AV 102, a time of travel, and a weather condition at the time of travel. The plurality of factors associated with the AV 102 may further include a speed constraint associated with the road, a traffic condition associated with the road, a road condition of the road, a duration of the ride along the route, a 3D map of the route, or a user preference provided by the user 114 to configure the components of the AV 102. At 604, the optimal configuration to operate the components of the AV 102 is selected. The optimal configuration may be selected by the AV configuration device 104, based on the acquired information, from the set of configurations associated with the components (as described in FIG. 2).

At 606, the components are configured based on the selected optimal. The AV configuration device 104 may configure the components in real time. At 608, it is determined by the AV configuration device 104 whether the AV 102 is operational. If at 608, it is determined that the AV 102 is operational, 602 is executed. If at 608, it is determined that the AV 102 is in-operational, the AV configuration device 104 stops acquiring the information. Thus, as long as the AV 102 is operational, the AV configuration device 104 optimizes the performance of the AV 102.

Figure 7:
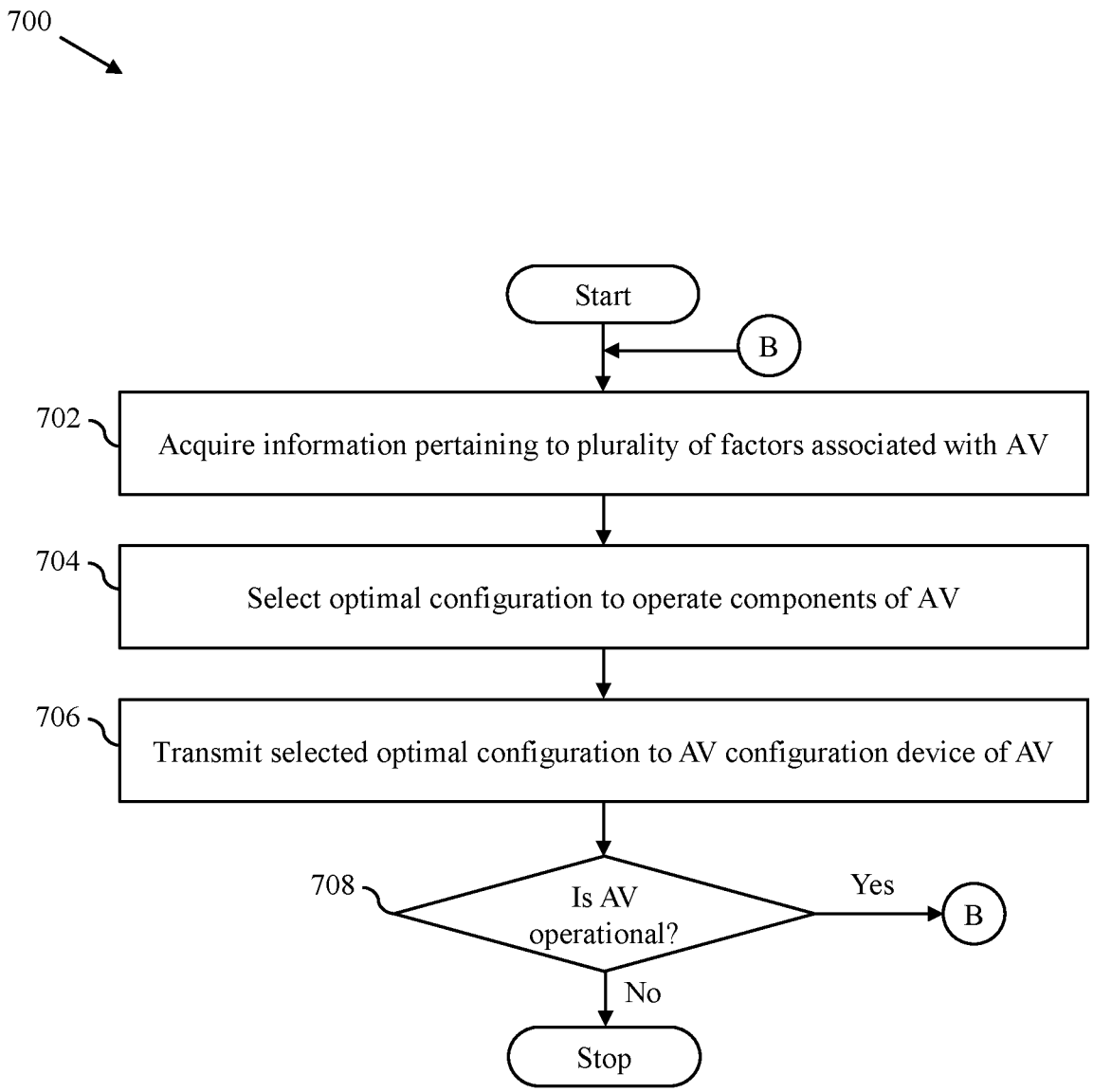
FIG. 7 is a flow chart that illustrates a method for optimizing the performance of the AV, in accordance with another embodiment of the disclosure.

FIG. 7 is a flow chart 700 that illustrates a method for optimizing the performance of the AV 102, in accordance with another embodiment of the disclosure.

At 702, the information pertaining to the plurality of factors associated with the AV 102 is acquired. The information may be acquired by the application server 108 from the first and second vehicles 106a and 106b, the database server 110, the AV configuration device 104, the location sensor 202, the LiDAR sensor 204, the RADAR sensor 206, the IR sensor 208, the image acquiring module 210, the ultrasonic sensor 212, or the like. The plurality of factors associated with the AV 102 may include a route to be traversed by the AV 102 for a ride, a type of a road included in the route, a real-time location of the AV 102, a time of travel, and a weather condition at the time of travel. The plurality of factors associated with the AV 102 may further include a speed constraint associated with the road, a traffic condition associated with the road, a road condition of the road, a duration of the ride along the route, a 3D map of the route, or a user preference provided by the user 114 to configure the components of the AV 102. At 704, the optimal configuration to operate the components of the AV 102 is selected. The optimal configuration may be selected by the application server 108, based on the acquired information, from the set of configurations associated with the components.

At 706, the selected configuration is transmitted to the AV configuration device 104. The selected optimal configuration may be transmitted to the AV configuration device 104 by the application server 108 in real time. The AV configuration device 104 may dynamically configure the components of the AV 102 based on the received optimal configuration. At 708, it is determined by the application server 108 whether the AV 102 is operational. If at 708, it is determined that the AV 102 is operational, 702 is executed. If at 708, it is determined that the AV 102 is in-operational, the application server 108 stops acquiring the information pertaining to the plurality of factors associated with the AV 102.

Figure 8:
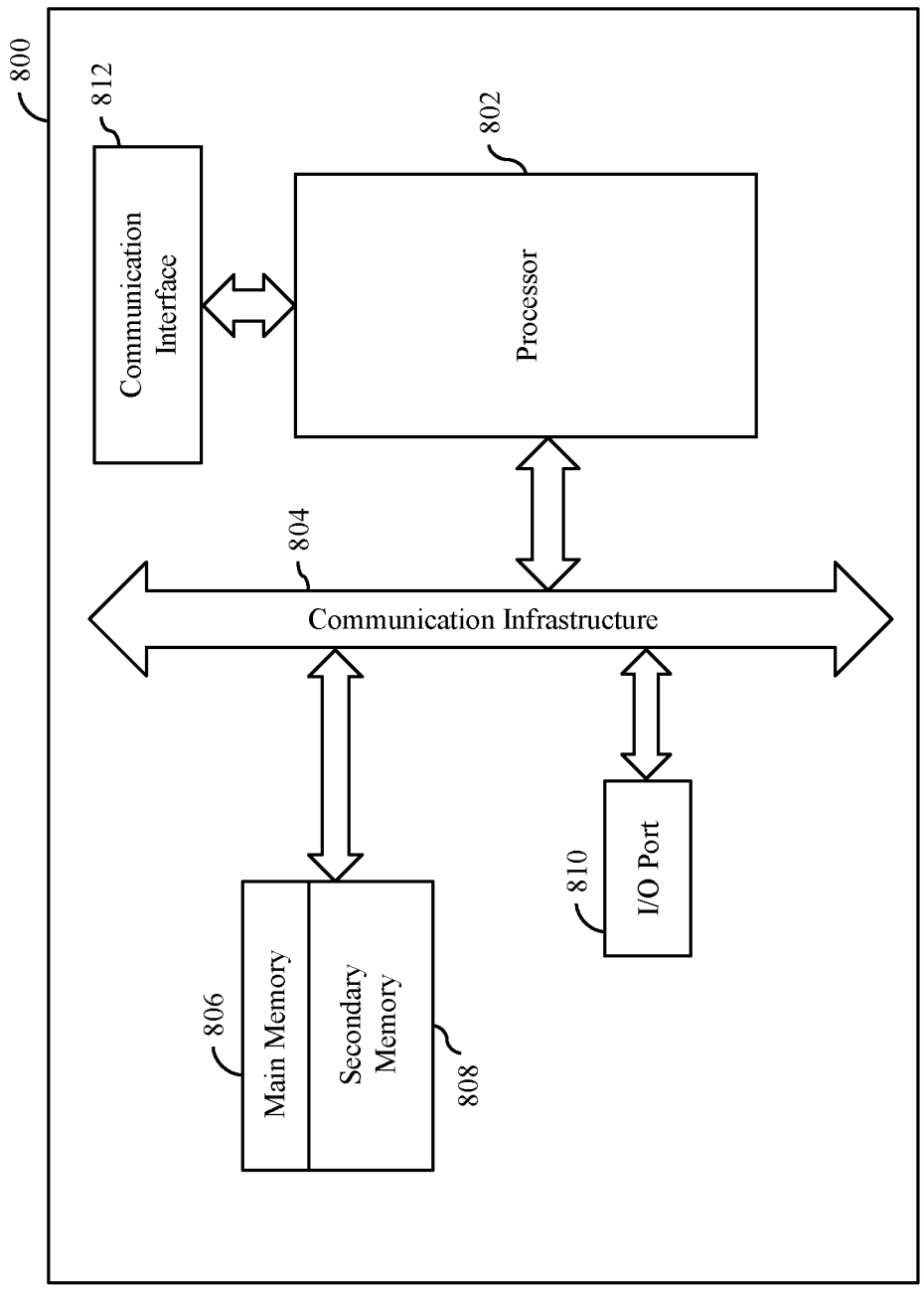
FIG. 8 is a block diagram that illustrates a computer system for optimizing the performance of the AV, in accordance with an embodiment of the disclosure.

FIG. 8 is a block diagram that illustrates a computer system 800 for optimizing the performance of the AV 102, in accordance with an embodiment of the disclosure. An embodiment of the disclosure, or portions thereof, may be implemented as computer readable code on the computer system 800. In one example, the application server 108 and the database server 110 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 6 and 7.

The computer system 800 includes a processor 802 that may be a special purpose or a general-purpose processing device. The processor 802 may be a single processor, multiple processors, or combinations thereof. The processor 802 may have one or more processor "cores." Further, the processor 802 may be connected to a communication infrastructure 804, such as a bus, abridge, a message queue, the communication network 116, multi-core message-passing scheme, or the like. The computer system 800 further includes a main memory 806 and a secondary memory 808. Examples of the main memory 806 may include random access memory (RAM), read-only memory (ROM), and the like. The secondary memory 808 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 800 further includes an input/output (I/O) port 810 and a communication interface 812. The I/O port 810 includes various input and output devices that are configured to communicate with the processor 802. Examples of the input devices may include a keyboard, a mouse, a joystick, a touchscreen, a microphone, and the like. Examples of the output devices may include a display screen, a speaker, headphones, and the like. The communication interface 812 may be configured to allow data to be transferred between the computer system 800 and various devices that are communicatively coupled to the computer system 800. Examples of the communication interface 812 may include a modem, a network interface, i.e., an Ethernet card, a communications port, and the like. Data transferred via the communication interface 812 may be signals, such as electronic, electromagnetic, optical, or other signals as will be apparent to a person skilled in the art. The signals may travel via a communications channel, such as the communication network 116 which may be configured to transmit the signals to the various devices that are communicatively coupled to the computer system 800. Examples of the communication channel may include a wired, wireless, and/or optical medium such as cable, fiber optics, a phone line, a cellular phone link, a radio frequency link, a wireless link, or the like. The main memory 806 and the secondary memory 808 may refer to non-transitory computer readable mediums that may provide data that enables the computer system 800 to implement the methods illustrated in FIGS. 6 and 7.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 802, and a memory, such as the main memory 806 and the secondary memory 808, implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Various embodiments of the disclosure provide the AV configuration device 104 for optimizing the performance of the AV 102 by dynamically configuring the components of the AV 102. The components may include the location sensor 202, the LiDAR sensor 204, the RADAR sensor 206, the IR sensor 208, the image acquiring module 210, the ultrasonic sensor 212, the speed controller 214, the fog lights 216, or the like. The AV configuration device 104 may acquire the information pertaining to the plurality of factors associated with the AV 102. The plurality of factors may include the route to be traversed by the AV 102 for the ride, the type of the road included in the route, the real-time location of the AV 102, the time of travel, and the weather condition at the time of travel. The AV configuration device 104 may select, from the set of configurations associated with the components of the AV 102, the first configuration (i.e., the optimal configuration) to operate the components. The first configuration is selected based on the acquired information. Further, the AV configuration device 104 may configure the components based on the selected first configuration. The power consumed by the components operating based on the first configuration is reduced relative to the power consumed by the components operating based on a second configuration.

Various embodiments of the disclosure provide the application server 108 for optimizing performance of the AV 102. The components may include the location sensor 202, the LiDAR sensor 204, the RADAR sensor 206, the IR sensor 208, the image acquiring module 210, the ultrasonic sensor 212, the speed controller 214, the fog lights 216, or the like. The application server 108 may acquire the information pertaining to the plurality of factors associated with the AV 102. The plurality of factors may include the route to be traversed by the AV 102 for the ride, the type of the road included in the route, the real-time location of the AV 102, the time of travel, and the weather condition at the time of travel. The application server 108 may select, from the set of configurations associated with the components of the AV 102, the first configuration to operate the components. The first configuration is selected based on the acquired information. Further, the application server 108 may transmit the selected first configuration to the AV configuration device 104. The components are configured to operate at the received first configuration by the AV configuration device 104. The power consumed by the components operating based on the first configuration is reduced relative to the power consumed by the components operating based on the second configuration.

Various embodiments of the disclosure provide a non-transitory computer readable medium having stored thereon, computer executable instructions, which when executed by a computer, cause the computer to execute operations for optimizing the performance of the AV 102 by dynamically configuring the components of the AV 102. The components may include the location sensor 202, the LiDAR sensor 204, the RADAR sensor 206, the IR sensor 208, the image acquiring module 210, the ultrasonic sensor 212, the speed controller 214, the fog lights 216, or the like. The operations include acquiring, by the AV configuration device 104, information pertaining to the plurality of factors associated with the AV 102. The plurality of factors may include the route to be traversed by the AV 102 for the ride, the type of the road included in the route, the real-time location of the AV 102, the time of travel, and the weather condition at the time of travel. The operations further include selecting, by the AV configuration device 104, from the set of configurations associated with the components of the AV 102, the first configuration to operate the components. The first configuration is selected based on the acquired information. Further, the operations include configuring, by the AV configuration device 104, the components based on the selected first configuration. The power consumed by the components operating based on the first configuration is reduced relative to the power consumed by the components operating based on the second configuration.

Various embodiments of the disclosure provide a non-transitory computer readable medium having stored thereon, computer executable instructions, which when executed by a computer, cause the computer to execute operations for optimizing performance of the AV 102 by dynamically configuring the components of the AV 102. The operations include acquiring, by the application server 108, the information pertaining to the plurality of factors associated with the AV 102. The plurality of factors may include the route to be traversed by the AV 102 for the ride, the type of the road included in the route, the real-time location of the AV 102, the time of travel, and the weather condition at the time of travel. The operations further include selecting, by the application server 108, from the set of configurations associated with the components of the AV 102, the first configuration to operate the components by the AV configuration device 104. The first configuration is selected based on the acquired information. Further, the operations include transmitting, by the application server 108, the selected first configuration to the AV configuration device 104. The components may be configured by the AV configuration device 104 to operate at the first configuration. The power consumed by the components operating based on the first configuration is reduced relative to the power consumed by the components operating based on the second configuration.

Thus, the method and system of the disclosure help to optimize the performance of the AV 102 in real time. The optimal configuration for operating the components of the AV 102 is selected by taking into consideration the information of various factors that may affect the performance of the AV 102. As the information is acquired in real time, any change in the factors is taken into consideration for selecting the optimal configuration. The AV configuration device 104 configures the components (for example, the LiDAR sensor 204, the RADAR sensor 206, the IR sensor 208, the fog lights 216, or the like) in such a manner, that only those components are operational that are essential for maintaining the safety KPIs of the AV 102. Since the components that are not essential for maintaining the safety KPIs are not operational, under the given factors, the power consumed by the components is minimum. As a result, the durability (i.e., the lifespan) of the components of the AV 102 is also increased.

Techniques consistent with the disclosure provide, among other features, systems and methods for optimizing the performance of the AV. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for optimizing performance of an autonomous vehicle (AV), the method comprising:
   acquiring, by an AV configuration device of the AV, information pertaining to a route to be traversed by the AV for a ride, a type of a road included in the route, a real-time location of the AV, a time of travel, a duration of the ride along the route, and a weather condition at the time of travel;
   selecting, by the AV configuration device, from a set of configurations associated with the AV, a first configuration to operate at least a speed controller that controls and limits a speed of the AV and an air conditioner of the AV, wherein the first configuration is selected based on the information acquired pertaining the route to be traversed by the AV for the ride, the type of the road included in the route, the real-time location of the AV, the time of travel, the duration of the ride along the route, and the weather condition at the time of travel; and
   configuring, by the AV configuration device, the speed controller and the air conditioner based on the selected first configuration, wherein a power consumed by the speed controller and the air conditioner operating at the first configuration is reduced relative to a power consumed by the speed controller and the air conditioner operating at a second configuration in the set of configurations.

2. The method of claim 1, wherein the information is acquired, by the AV configuration device, from one or more sensors of the AV, and a server in communication with the AV.

3. The method of claim 1, wherein the weather condition includes at least one of an amount of daylight or a type of weather, at the time of travel.

4. The method of claim 1, wherein the information is further acquired pertaining to a speed constraint associated with the road, a traffic condition associated with the road, a road condition of the road, and a user preference provided by a user to configure the speed controller and the air conditioner of the AV.

5. The method of claim 1, wherein the information is further acquired pertaining to a three-dimensional map of the route.

6. The method of claim 1, wherein the first configuration is selected to further operate a processor of the AV, one or more sensors of the AV, an entertainment system of the AV, one or more head lights of the AV, and one or more tail lights of the AV.

7. The method of claim 6, wherein the one or more sensors correspond to an image sensor, a light detection and ranging (LiDAR) sensor, an infrared sensor, a radio detection and ranging (RADAR) sensor, and an ultrasonic sensor.

8. The method of claim 1, wherein a durability of the speed controller and the air conditioner operating at the first configuration is increased relative to a durability of the speed controller and the air conditioner operating at the second configuration.

9. The method of claim 1, wherein the information is acquired, by the AV configuration device, from a different vehicle that is in a communication range of the AV and is travelling along the same route as the AV.

10. The method of claim 1, further comprising configuring, by the AV configuration device, a location sensor of the AV to switch-off based on the selected first configuration and after acquisition of navigation information pertaining to the route to be traversed by the AV for the ride, wherein a power consumed by the location sensor operating at the first configuration is reduced relative to a power consumed by the location sensor operating at the second configuration.

11. An autonomous vehicle (AV) configuration device in an AV for optimizing performance of the AV, the AV configuration device comprising:
   circuitry configured to:
      acquire information pertaining to a route to be traversed by the AV for a ride, a type of a road included in the route, a real-time location of the AV, a time of travel, a duration of the ride along the route, and a weather condition at the time of travel;
      select, from a set of configurations associated with the AV, a first configuration to operate at least a speed controller that controls and limits a speed of the AV and an air conditioner of the AV, wherein the first configuration is selected based on the acquired information acquired pertaining the route to be traversed by the AV for the ride, the type of the road included in the route, the real-time location of the AV, the time of travel, the duration of the ride along the route, and the weather condition at the time of travel; and
      configure the speed controller and the air conditioner based on the selected first configuration, wherein a power consumed by the speed controller and the air conditioner operating at the first configuration is reduced relative to a power consumed by the speed controller and the air conditioner operating at a second configuration in the set of configurations.

12. The AV configuration device of claim 11, wherein the circuitry is configured to acquire the information from one or more sensors of the AV, a server in communication with the AV, and a vehicle that is in communication with the AV.

13. The AV configuration device of claim 11, wherein the weather condition includes at least one of an amount of daylight or a type of weather, at the time of travel.

14. The AV configuration device of claim 11, wherein the information is further acquired pertaining to a speed constraint associated with the road, a traffic condition associated with the road, a road condition of the road, and a user preference provided by a user to configure the speed controller and the air conditioner of the AV.

15. The AV configuration device of claim 11, wherein the first configuration is further selected to operate a processor of the AV, one or more sensors of the AV, an entertainment system of the AV, one or more head lights of the AV, and one or more tail lights of the AV.

16. The AV configuration device of claim 15, wherein the one or more sensors correspond to an image sensor, a light detection and ranging (LiDAR) sensor, an infrared sensor, and a radio detection and ranging (RADAR) sensor.

17. The AV configuration device of claim 11, wherein a durability of the speed controller and the air conditioner operating at the first configuration is increased relative to a durability of the speed controller and the air conditioner operating at the second configuration.

18. A method for optimizing performance of an autonomous vehicle (AV), the method comprising:
   acquiring, by a server in communication with the AV, information pertaining to a route to be traversed by the AV for a ride, a type of a road included in the route, a real-time location of the AV, a time of travel, a type of weather at the time of travel, a duration of the ride along the route, and an amount of daylight at the time of travel;
   selecting, by the server, from a set of configurations associated with the AV, a first configuration to operate at least a speed controller that controls and limits a speed of the AV and an air conditioner of the AV, wherein the first configuration is selected based on the information acquired pertaining the route to be traversed by the AV for the ride, the type of the road included in the route, the real-time location of the AV, the time of travel, the duration of the ride along the route, and the weather condition at the time of travel; and
   transmitting, by the server, the selected first configuration to an AV configuration device of the AV, wherein the speed controller and the air conditioner are configured to operate at the selected first configuration by the AV configuration device, and wherein a power consumed by the speed controller and the air conditioner operating at the first configuration is reduced relative to a power consumed by the speed controller and the air conditioner operating at a second configuration in the set of configurations.

19. The method of claim 18, wherein the information is further acquired pertaining to a three-dimensional map of the route, a road condition of the road, a speed constraint associated with the road, a traffic condition on the road, and a user preference provided by a user to configure the speed controller and the air controller of the AV.

20. The method of claim 18, wherein a durability of the speed controller and the air controller operating at the first configuration is increased relative to a durability of the speed controller and the air conditioner operating at the second configuration.

* * * * *